US012676988B2

(12) United States Patent
Zhao et al.

(10) Patent No.: US 12,676,988 B2
(45) Date of Patent: Jul. 7, 2026

(54) RECURSIVE INTRA REGION PARTITIONING

(71) Applicant: TENCENT AMERICA LLC, Palo Alto, CA (US)

(72) Inventors: Liang Zhao, Sunnyvale, CA (US); Xin Zhao, San Jose, CA (US); Han Gao, San Diego, CA (US); Jing Ye, San Jose, CA (US); Madhu Peringassery Krishnan, Mountain View, CA (US); Yushin Cho, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/633,217

(22) Filed: Apr. 11, 2024

(65) Prior Publication Data

US 2025/0106404 A1 Mar. 27, 2025

Related U.S. Application Data

(60) Provisional application No. 63/539,997, filed on Sep. 22, 2023.

(51) Int. Cl.
| | |
|---|---|
| *H04N 19/159* | (2014.01) |
| *H04N 19/103* | (2014.01) |
| *H04N 19/186* | (2014.01) |
| *H04N 19/70* | (2014.01) |

(52) U.S. Cl.
CPC ......... *H04N 19/159* (2014.11); *H04N 19/103* (2014.11); *H04N 19/186* (2014.11); *H04N 19/70* (2014.11)

(58) Field of Classification Search
None
See application file for complete search history.

(56) References Cited

U.S. PATENT DOCUMENTS

| | | | | | |
|---|---|---|---|---|---|
| 10,516,885 | B1 * | 12/2019 | Li | ........................ | H04N 19/176 |
| 11,677,954 | B2 * | 6/2023 | Li | ........................ | H04N 19/132 |
| | | | | | 375/240.02 |
| 12,206,864 | B2 * | 1/2025 | Seregin | ................ | H04N 19/176 |
| 12,309,381 | B2 * | 5/2025 | Li | ........................ | H04N 19/176 |
| 2020/0021810 | A1 * | 1/2020 | Li | ........................ | H04N 19/176 |
| 2020/0177900 | A1 * | 6/2020 | Xu | ........................ | H04N 19/43 |
| 2020/0186792 | A1 * | 6/2020 | Zhao | .................... | H04N 19/159 |
| 2020/0221109 | A1 * | 7/2020 | Xu | ........................ | H04N 19/44 |

(Continued)

OTHER PUBLICATIONS

International Search Report and Written Opinion issued in International Application No. PCT/US2024/025237 dated Jul. 31, 2024, 16 pages.

*Primary Examiner* — Mohammad J Rahman
(74) *Attorney, Agent, or Firm* — Crowell & Moring LLP

(57) ABSTRACT

This disclosure relates generally to video coding and particularly to methods, devices, and systems for signaling prediction modes in recursively partitioned video frames. For example, a regional prediction mode flag syntax element may be introduced for indicating whether an entire coding region of a video frame signaled as being of a first predefined prediction mode is entirely coded in a second predefined prediction mode or not. The signaling schemes described in this disclosure facilitate reducing signaling overhead in video frames that employ a mix of different prediction modes.

18 Claims, 13 Drawing Sheets

(56) References Cited

U.S. PATENT DOCUMENTS

| | | | | |
|---|---|---|---|---|
| 2020/0296410 | A1* | 9/2020 | Xu | H04N 19/176 |
| 2021/0112245 | A1* | 4/2021 | Xu | H04N 19/105 |
| 2021/0243455 | A1* | 8/2021 | Rapaka | H04N 19/119 |
| 2021/0321101 | A1* | 10/2021 | Yang | H04N 19/124 |
| 2021/0377540 | A1* | 12/2021 | Li | H04N 19/105 |
| 2022/0046239 | A1 | 2/2022 | Lin et al. | |

* cited by examiner

Level 1 Level 2 Level 3 Level 4

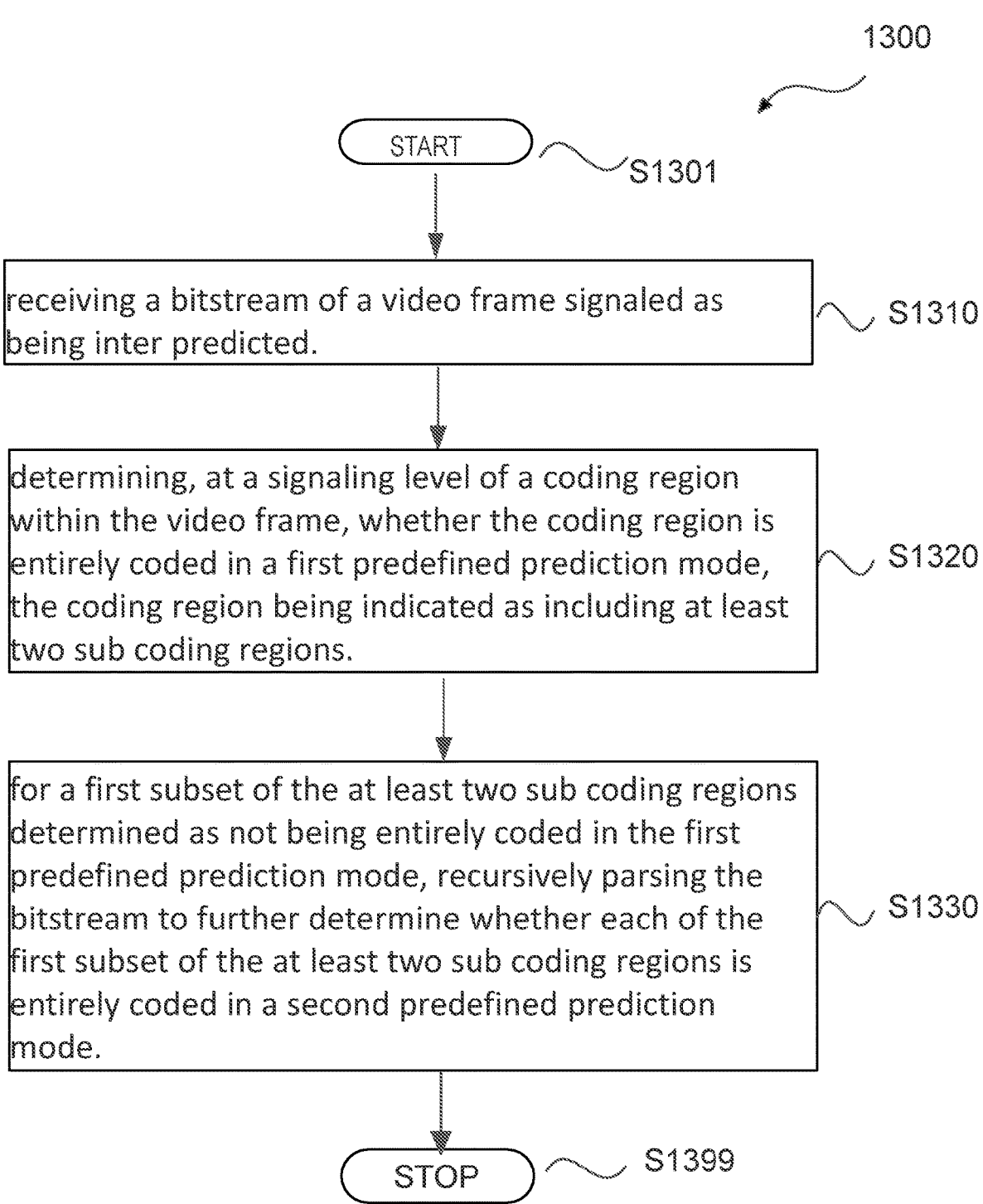

1300

START _____ S1301 receiving a bitstream of a video frame signaled as being inter predicted. ~ S1310 determining, at a signaling level of a coding region within the video frame, whether the coding region is entirely coded in a first predefined prediction mode, the coding region being indicated as including at least two sub coding regions. ~ S1320 for a first subset of the at least two sub coding regions determined as not being entirely coded in the first predefined prediction mode, recursively parsing the bitstream to further determine whether each of the first subset of the at least two sub coding regions is entirely coded in a second predefined prediction mode. ~ S1330

STOP _____ S1399

FIG. 13

RECURSIVE INTRA REGION PARTITIONING

INCORPORATION BY REFERENCE

This application is based on and claims the benefit of priority to U.S. Provisional Patent Application No. 63/539, 997 filed on Sep. 22, 2023 and entitled "Recursive Intra Region Partitioning," which is herein incorporated by reference in its entirety.

TECHNICAL FIELD

This disclosure relates generally to video coding and particularly to methods and systems for signaling prediction modes in recursively partitioned blocks.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques while reducing signaling overhead.

SUMMARY

This disclosure relates generally to video coding and particularly to methods, devices, and systems for signaling prediction modes in recursively partitioned video frames. For example, a regional prediction mode flag syntax element may be introduced for indicating whether an entire coding region of a video frame signaled as being of a first predefined prediction mode is entirely coded in a second predefined prediction mode or not. The signaling schemes described in this disclosure facilitate reducing signaling overhead in video frames that employ a mix of different prediction modes.

In some example implementations, a method is disclosed. The method may include receiving a bitstream of a video frame signaled as being inter predicted; determining, at a signaling level of a coding region within the video frame, whether the coding region is entirely coded in a first predefined prediction mode, the coding region being indicated as including at least two sub coding regions; and for a first subset of the at least two sub coding regions determined as not being entirely coded in the first predefined prediction mode, recursively parsing the bitstream to further determine whether each of the first subset of the at least two sub coding regions is entirely coded in a second predefined prediction mode.

In the example implementations above, the first subset of the at least two sub coding regions is smaller than a full set of the at least two sub coding regions.

In any one of the example implementations above, for a second subset of the at least two sub coding regions determined as being entirely coded in the first predefined prediction mode, skipping parsing the bitstream for purposes of determining a prediction mode of the second subset of the at least two sub coding regions.

In any one of the example implementations above, determining whether the coding region is entirely coded in the first predefined prediction mode comprises one of: determining a presence or absence of a regional prediction mode flag syntax element in the bitstream at the signaling level of the coding region as an indication of whether or not the coding region is entirely coded in the first predefined prediction mode, respectively; or determining a value of the regional prediction mode flag syntax element in the bitstream at the signaling level of the coding region to determine whether the coding region is entirely coded in the first predefined prediction mode or not.

In any one of the example implementations above, when it is determined that the coding region is entirely coded in the first predefined prediction mode, determining that no regional prediction mode flag syntax element is included in the bitstream for any of the at least two sub coding regions and any further partitions of the at least two sub coding regions.

In any one of the example implementations above, when it is determined that the coding region is not entirely coded in the first predefined prediction mode, the method includes further determining at a signaling level of the at least two sub coding regions whether each of the at least two sub coding regions that is a non-leaf partition is entirely coded in the first predefined prediction mode.

In any one of the example implementations above, the regional prediction mode flag syntax element, when present at the signaling level of the coding region, is included in the bitstream after a partitioning mode syntax element for the coding region, the partitioning mode syntax element indicating that the coding region is further partitioned into the at least two sub coding regions.

In any one of the example implementations above, when it is determined that the coding region is not entirely coded in the first predefined prediction mode, and in response to determining that a sub coding region of the at least two sub coding regions is a leaf partition: skipping parsing the bitstream for any regional prediction mode flag syntax element for the sub coding region; and parsing the bitstream for a prediction mode indicator syntax element for the sub coding region to determine its prediction mode.

In any one of the example implementations above, when it is determined that the coding region is entirely coded in the first predefined prediction mode, the method further includes skipping parsing the bitstream for any prediction mode indicator syntax element for any leaf partition of the coding region.

In any one of the example implementations above, a regional prediction mode flag syntax element indicative of whether the coding region is entirely coded in the first predefined prediction mode is signaled in the bitstream at the signaling level of the coding region only when a size of the coding region is smaller than or equal to a predefined size threshold.

In any one of the example implementations above, the size of the coding region comprises a width, a height, a maximum of width and height, or an area of the coding region measured by a number of samples.

In any one of the example implementations above, the size of the coding region comprises the area of the coding region and the predefined size threshold is 1024.

In any one of the example implementations above, a size of the coding region is used as a context for entropy coding a regional prediction mode flag syntax element in the bitstream at the signaling level of the coding region for indicating whether the coding region is entirely coded in the first predefined prediction mode.

In any one of the example implementations above, the method may further include determining, at a signaling level higher than the coding region, an regional prediction mode enablement syntax element that indicate whether to a signaling of a regional prediction mode flag syntax element for the coding region in the bitstream is enabled or not, the regional prediction mode flag syntax element being used to indicate whether the coding region is entirely coded in the first predefined prediction mode.

In any one of the example implementations above, the first predefined prediction mode comprises an intra prediction mode; and when it is determined that the coding region is entirely coded in the intra prediction mode, the method further comprises determining partition modes for luma component and chroma components of the coding region separately, or determining partition modes for luma component and chroma components of the coding region separately in response to a predefined set of conditions.

In any one of the example implementations above, the partition modes for the luma component and the chroma components of the coding region are signaled separately in the bitstream.

In any one of the example implementations above, the predefined set of conditions comprise criteria relating to at least one of: a size of the coding region being less than a predefined size threshold; a quantization parameter value; and information related to a temporal layer of the video frame.

In some other example implementations, a video encoder comprising a memory for storing instructions and a processor is disclosed. The processor is configured to execute the instructions to: determine that a video frame is inter predicted and include in a bitstream of the video frame a first signaling indicating that the video frame is inter predicted; determine, at a level of a coding region within the video frame, whether the coding region is entirely coded in a first predefined prediction mode, the coding region being indicated in the bitstream as including at least two sub coding regions; and for a first subset of the at least two sub coding regions determined as not being entirely coded in the first predefined prediction mode, further determine and include a second signaling in the bitstream to indicate whether each of the first subset of the at least two sub coding regions is to be entirely coded in a second predefined prediction mode Aspects of the disclosure also provide an electronic device or apparatus including a circuitry or processor configured to carry out any of the method implementations above.

Aspects of the disclosure also provide non-transitory computer-readable mediums storing instructions which when executed by an electronic device, cause the electronic device to perform any one of the method implementations above.

Aspects of the disclosure also provide non-transitory computer-readable recording mediums for storing the bitstream above.

BRIEF DESCRIPTION OF THE DRAWINGS

Further features, the nature, and various advantages of the disclosed subject matter will be more apparent from the following detailed description and the accompanying drawings in which.

4

Figure 3:
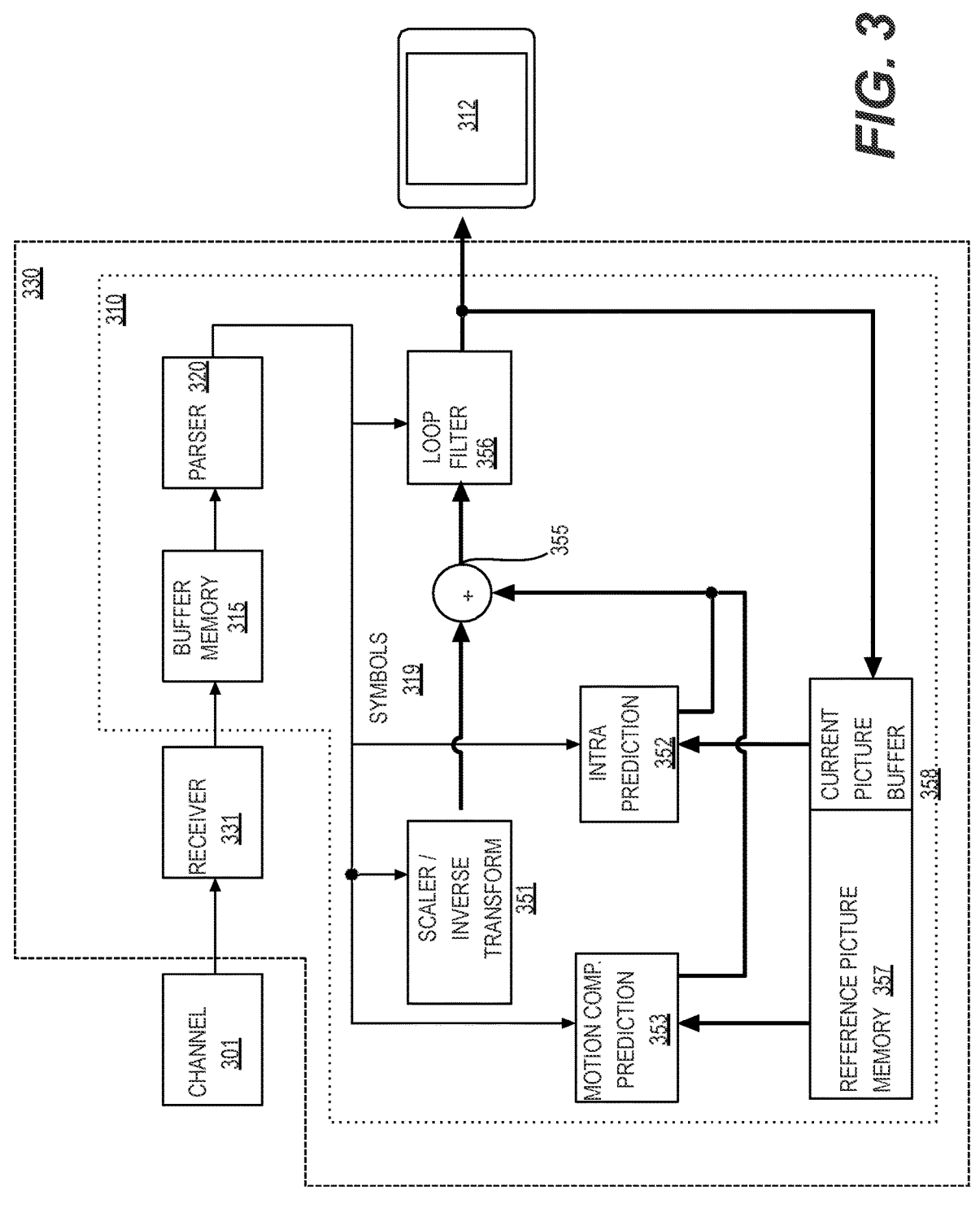
Figure 4:
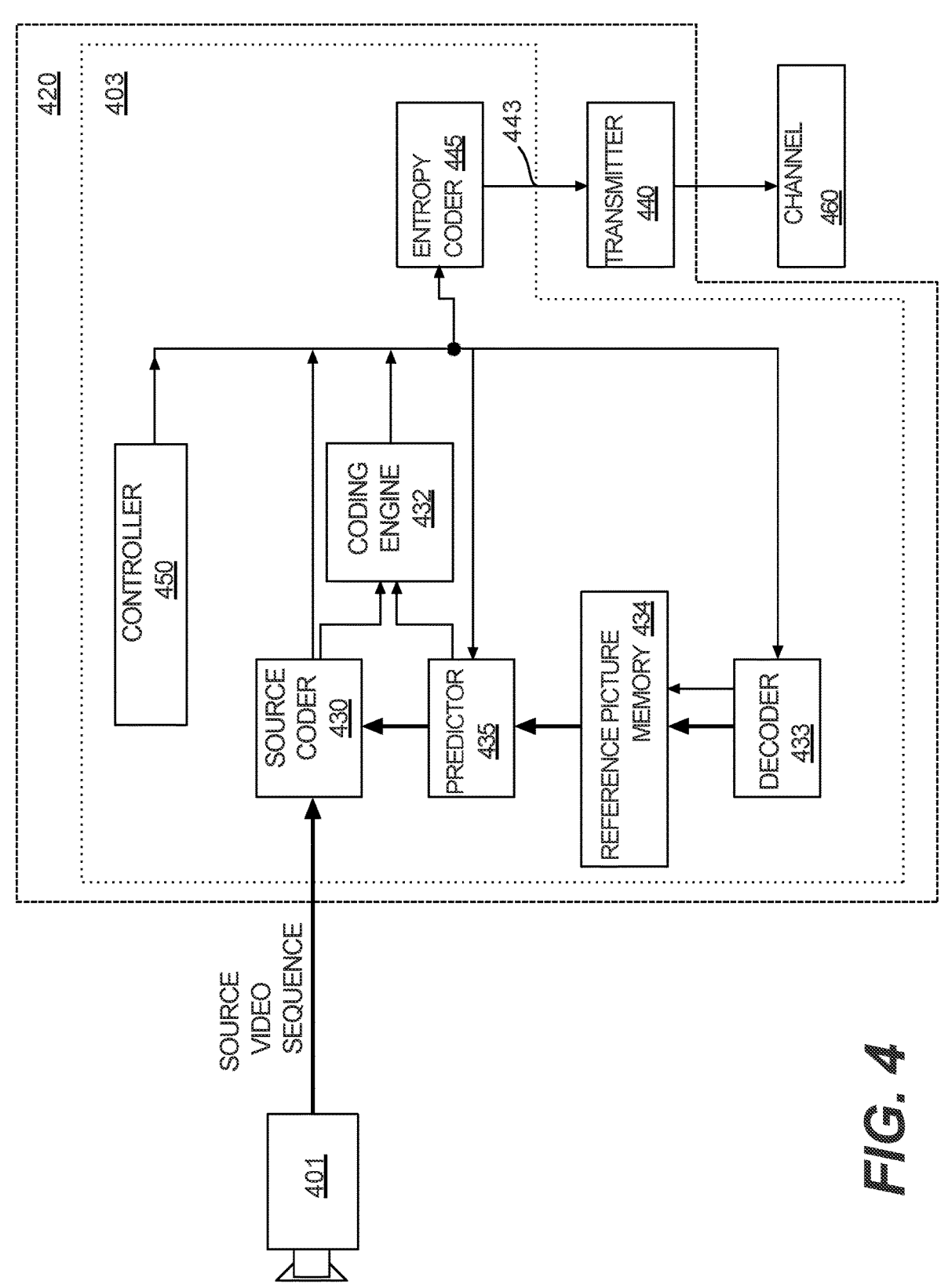
Figure 5:
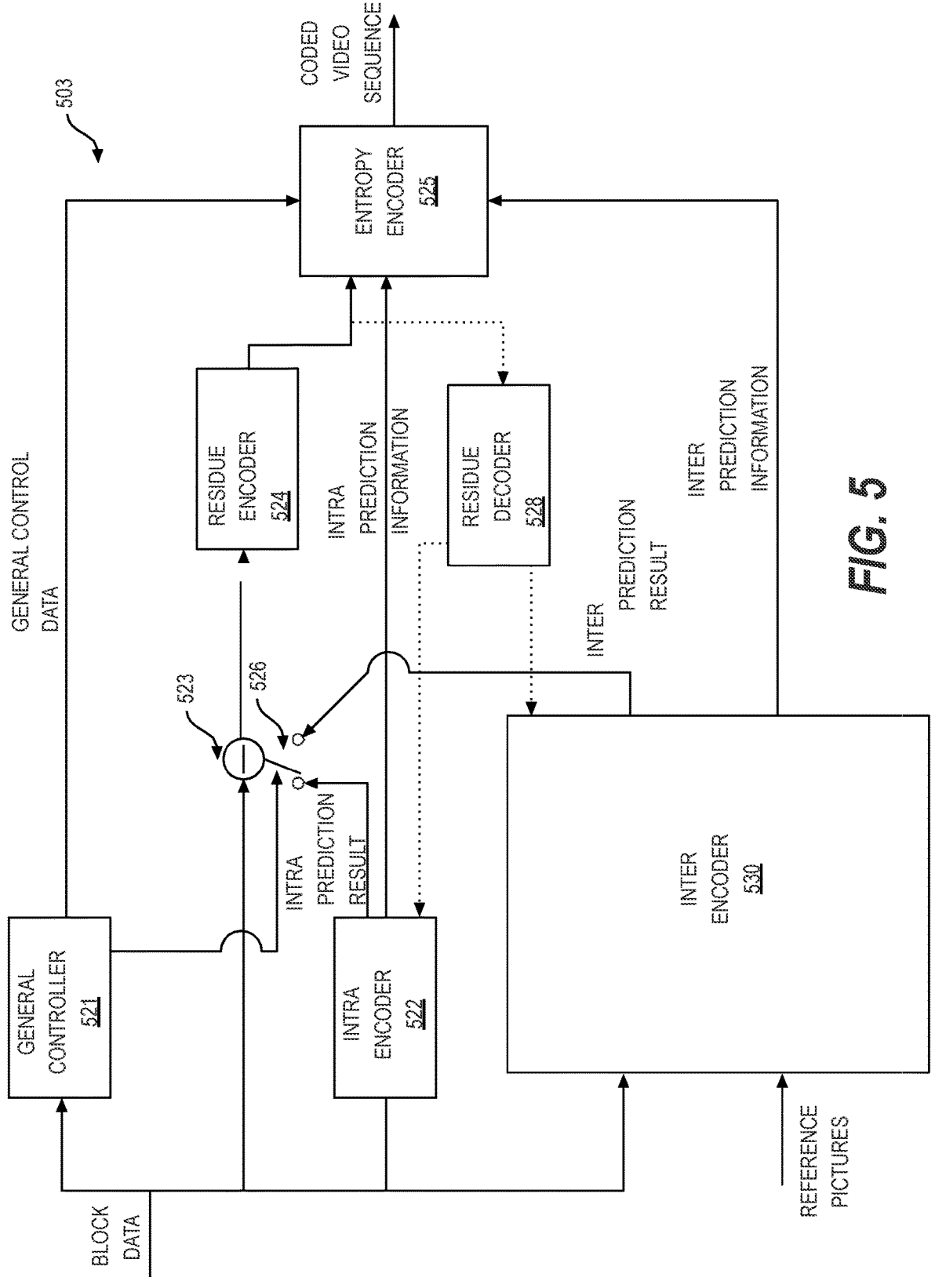
Figure 6:
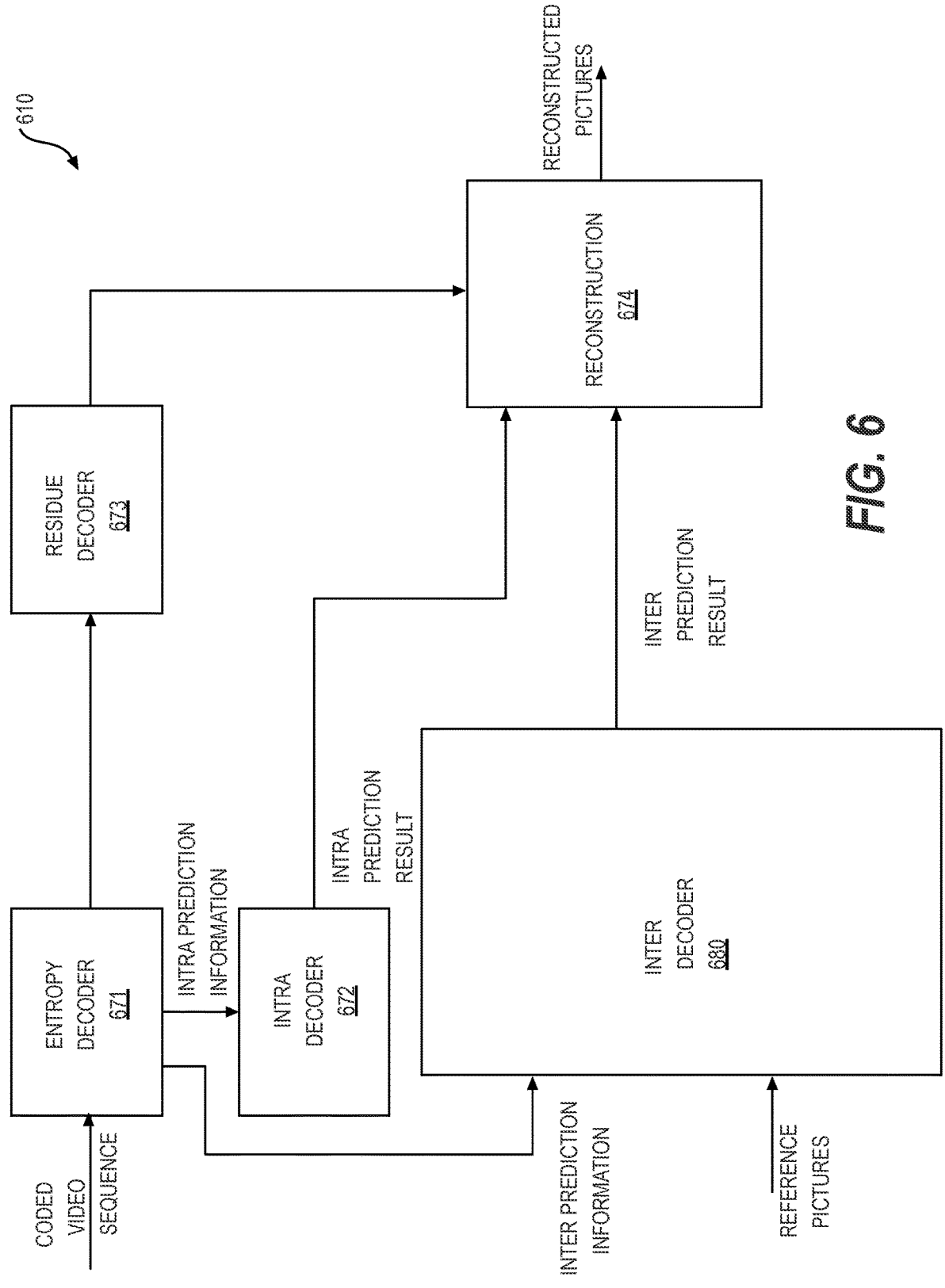
Figure 7:
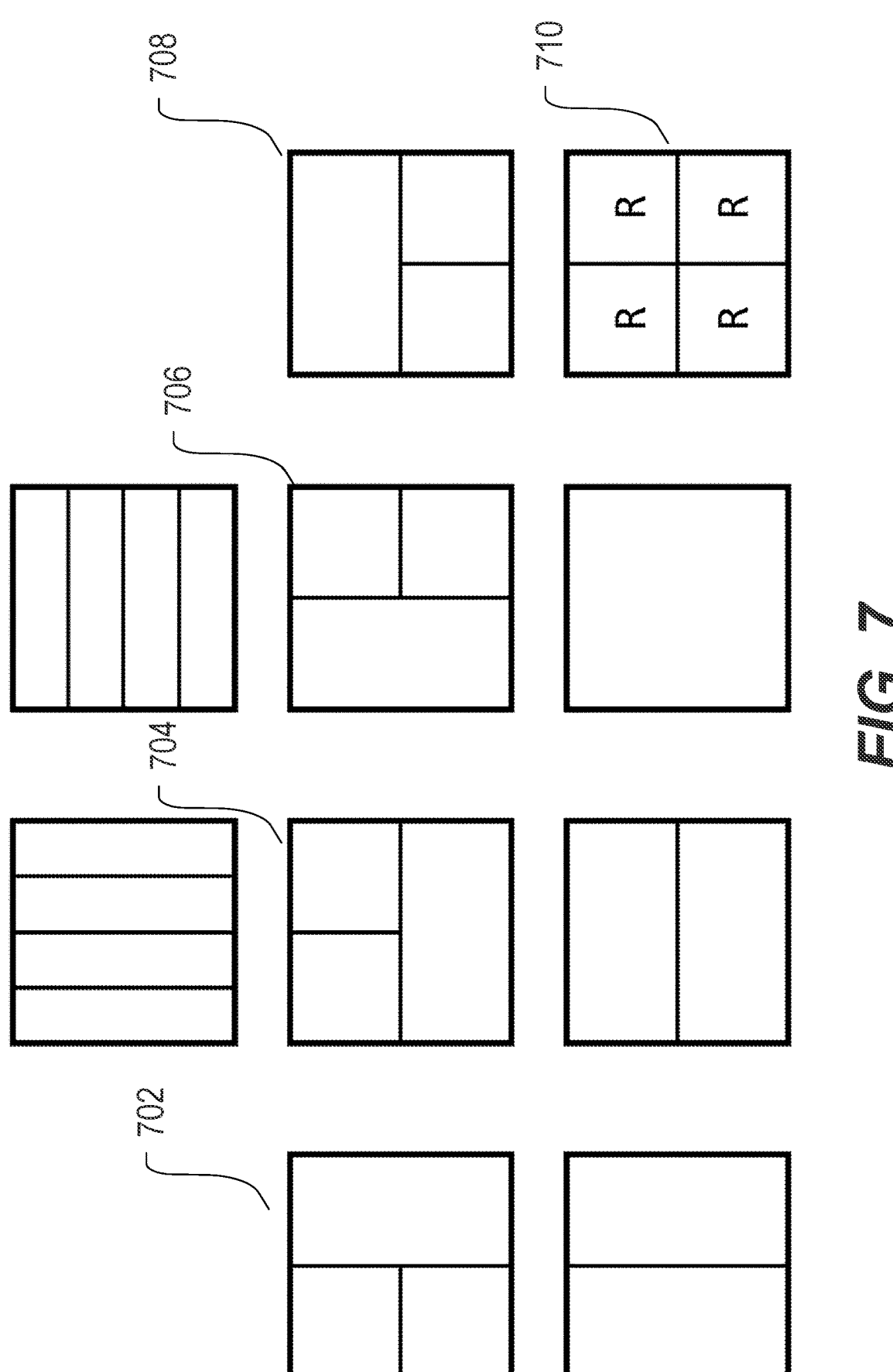
Figures 8, 9:
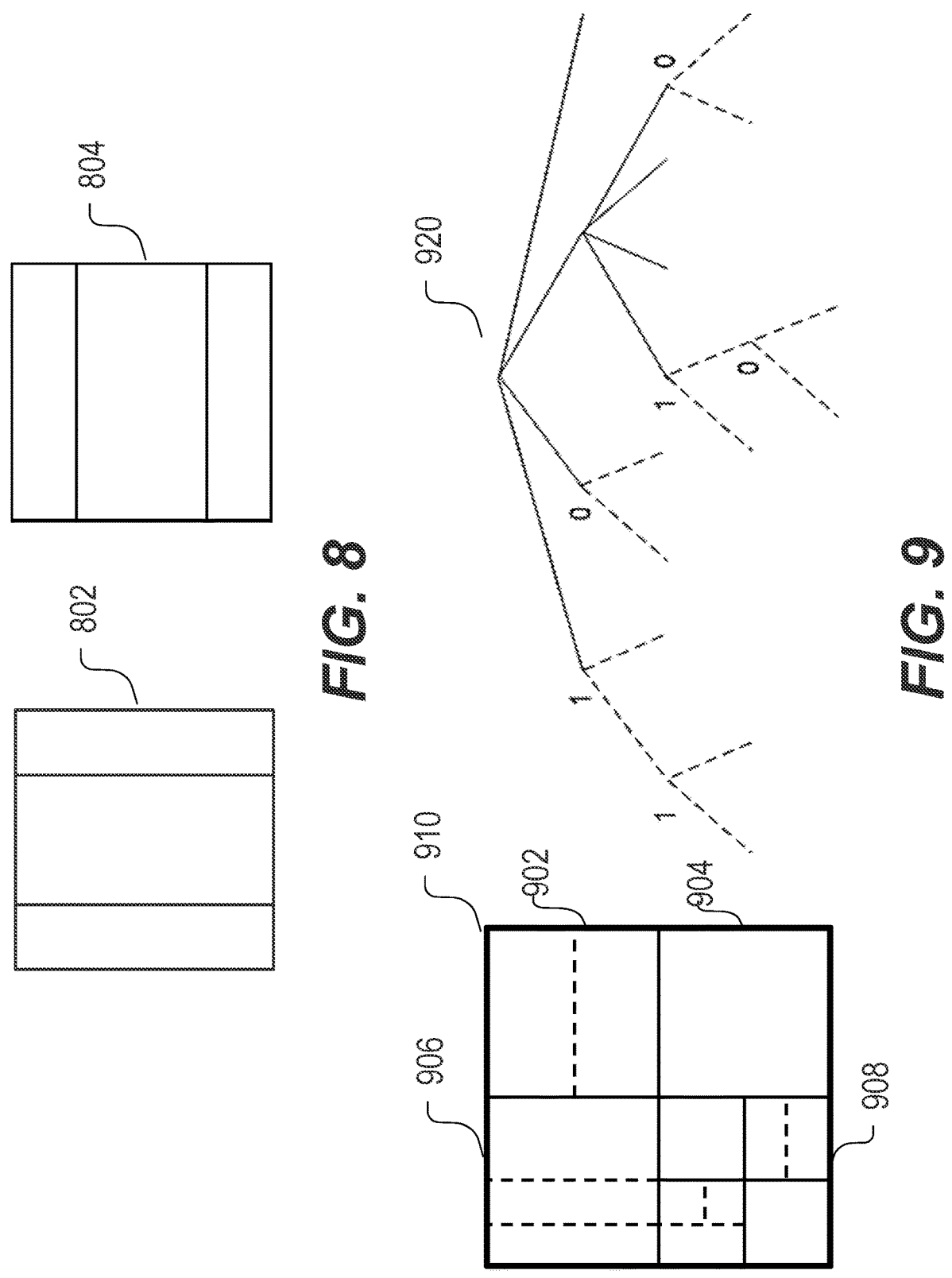
Figure 10:
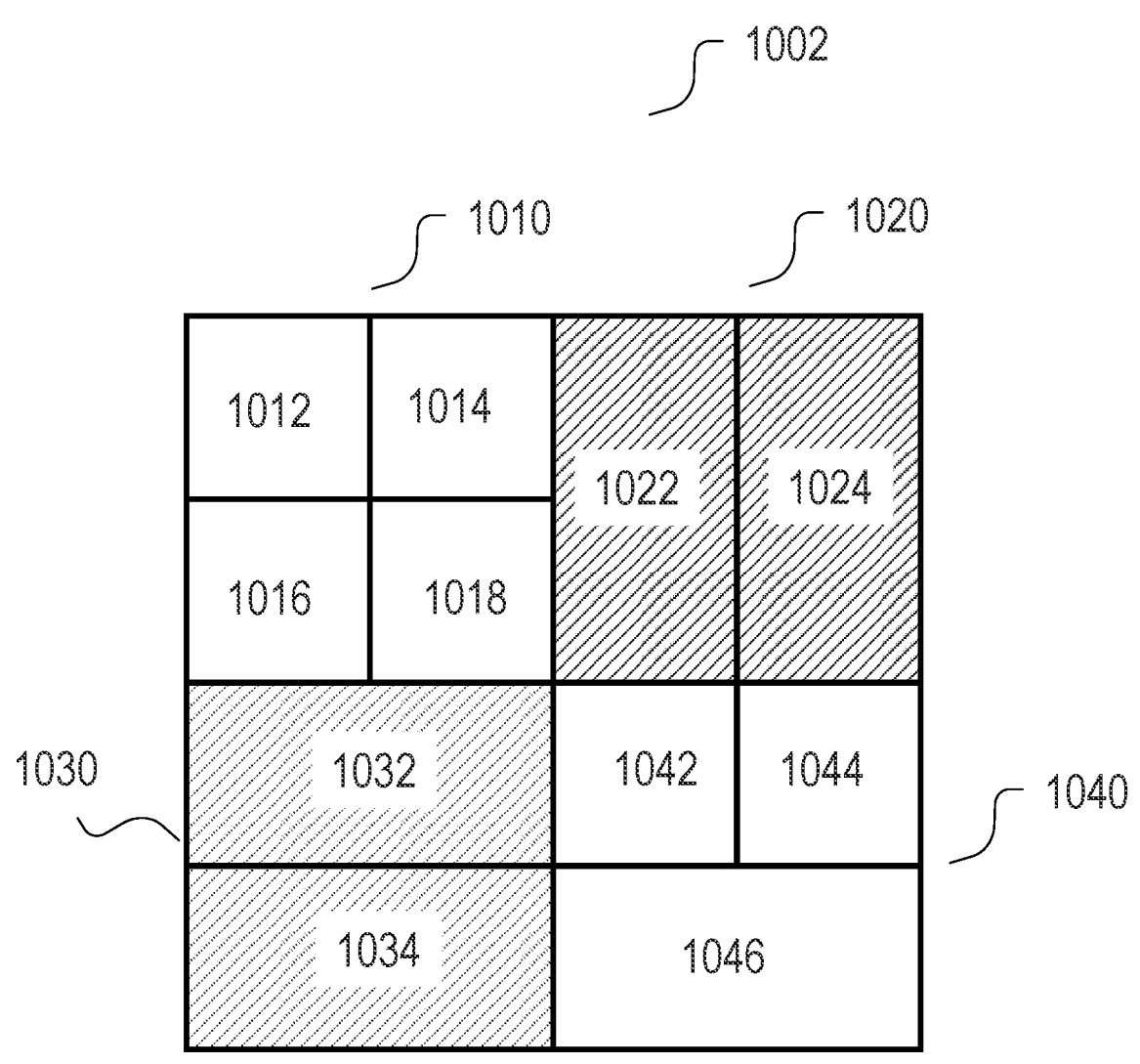

FIG. 3 shows a schematic illustration of a simplified block diagram of a video decoder in accordance with an example embodiment;

FIG. 4 shows a schematic illustration of a simplified block diagram of a video encoder in accordance with an example embodiment;

FIG. 5 shows a block diagram of a video encoder in accordance with another example embodiment;

FIG. 6 shows a block diagram of a video decoder in accordance with another example embodiment;

FIG. 7 shows a scheme of coding block partitioning according to example embodiments of the disclosure;

FIG. 8 shows another scheme of coding block partitioning according to example embodiments of the disclosure;

FIG. 9 shows another scheme of coding block partitioning according to example embodiments of the disclosure;

FIG. 10 illustrates compound motion compensation.

Figure 11:
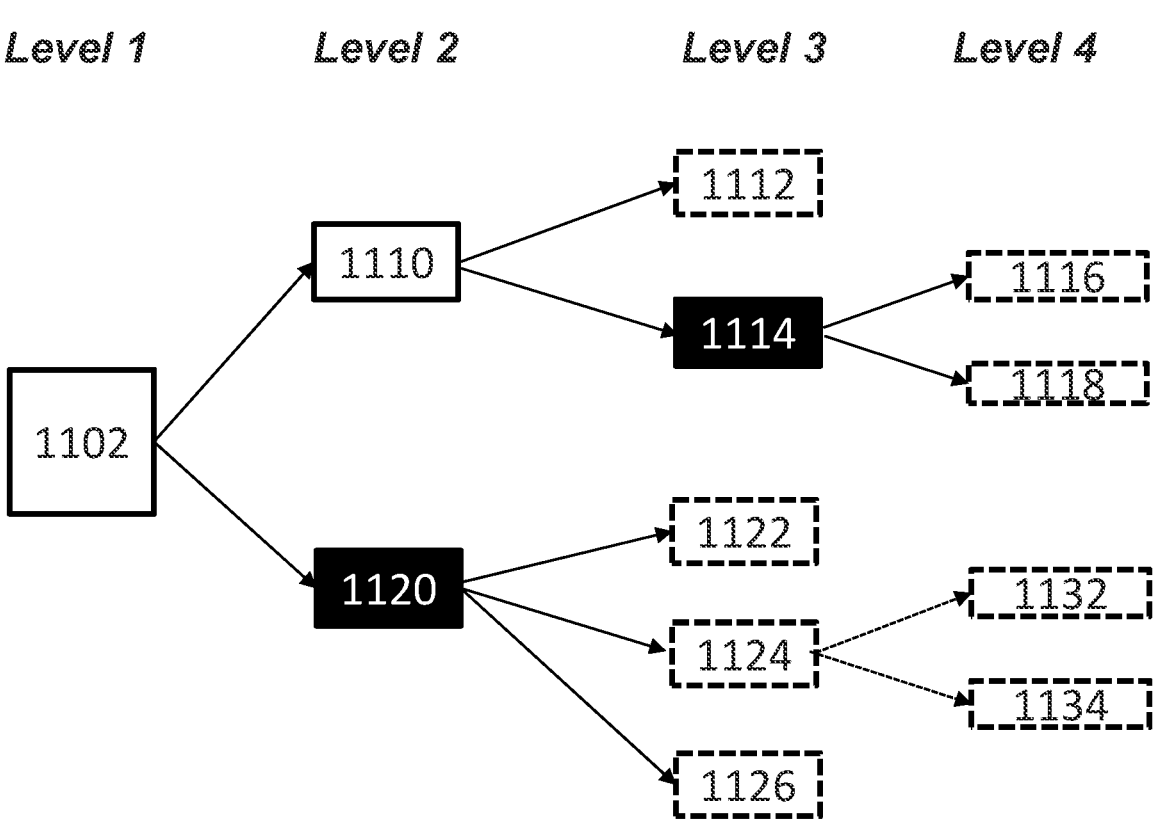

FIG. 11 illustrates an example recursive intra region partitioning.

Figure 12:
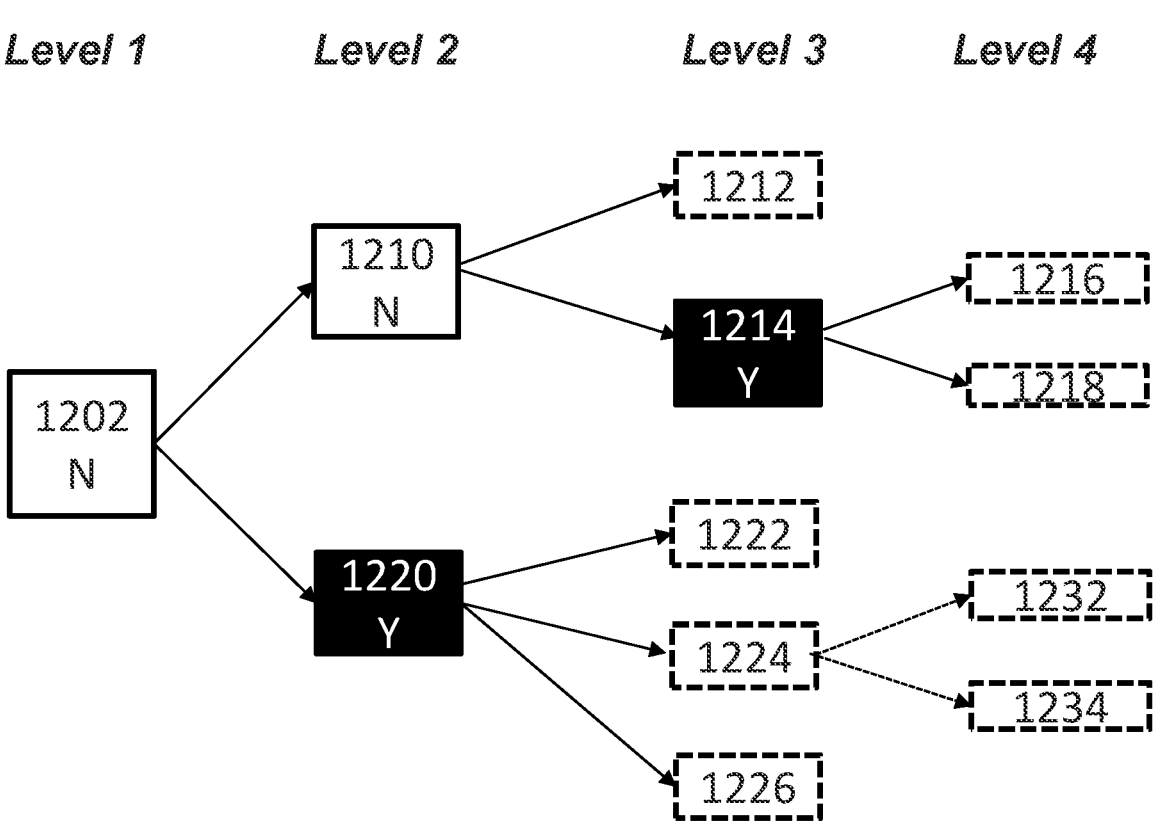

FIG. 12 illustrates an example signaling for recursive intra region partitioning.

FIG. 13 shows an example logic flow for a method for recursive intra region partitioning.

Figure 14:
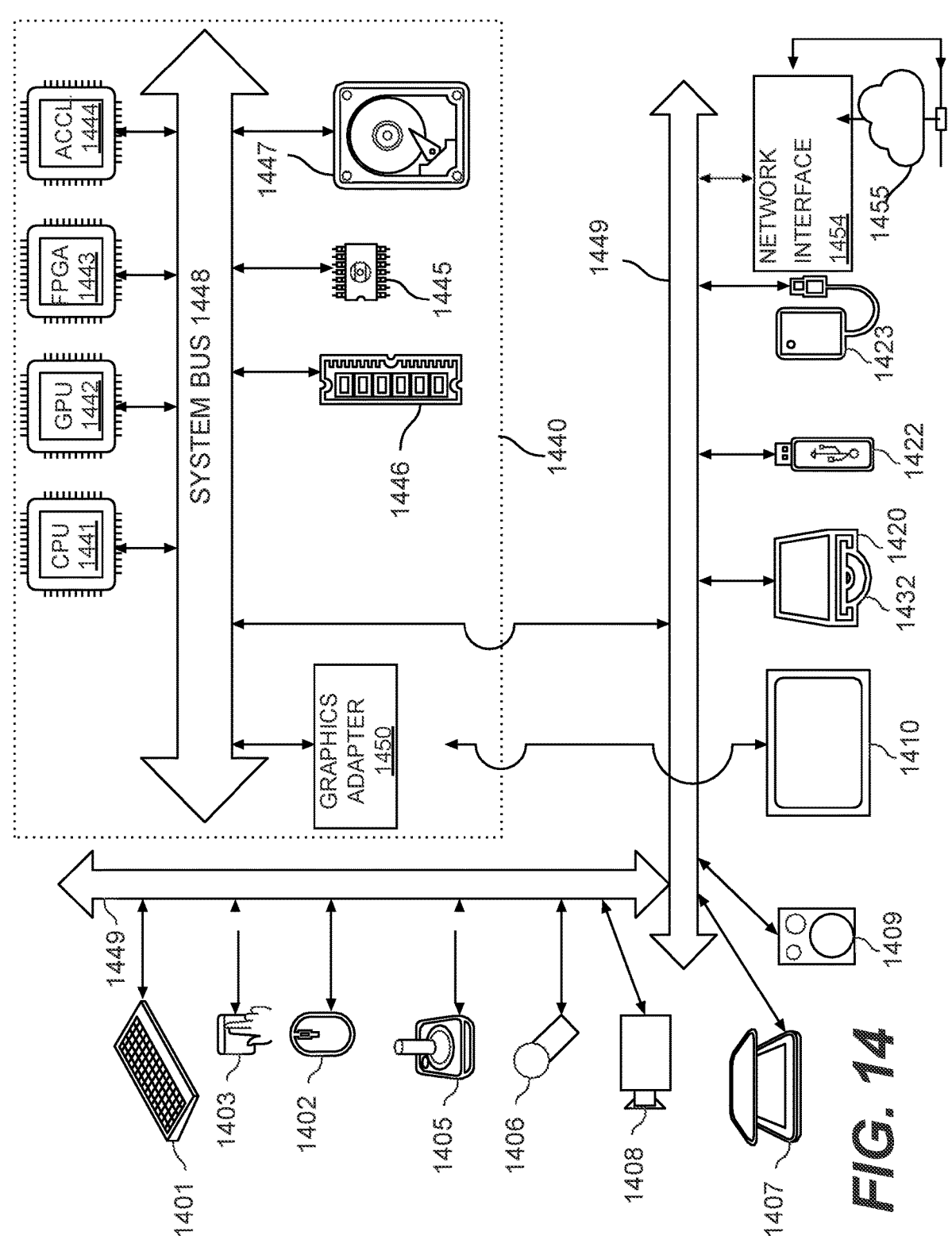

FIG. 14 shows a schematic illustration of a computer system in accordance with example embodiments of this disclosure.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

Figure 1:
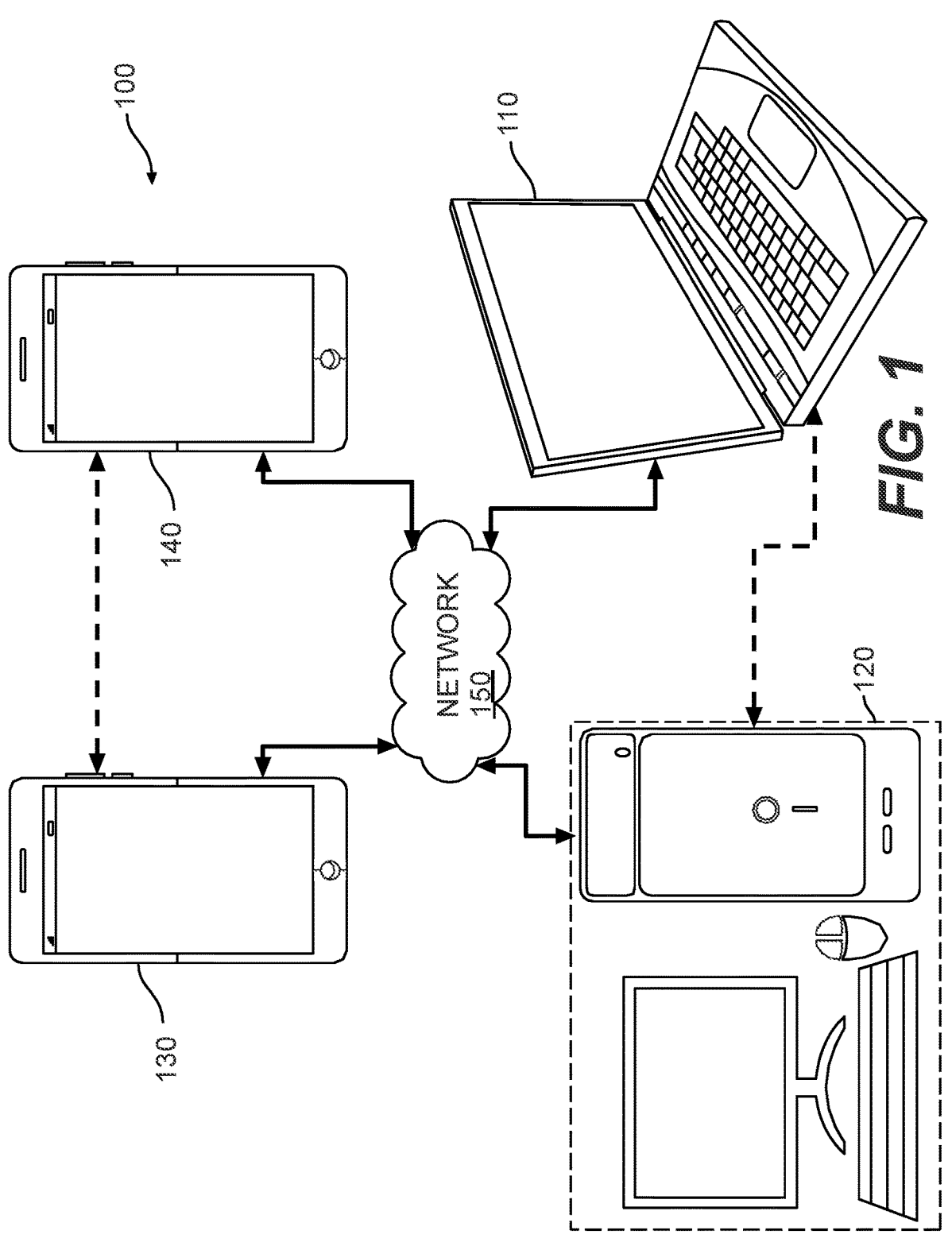
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100) includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video data in the form of one or more coded bitstreams (e.g., of a stream of video pictures that are captured by the terminal device (110)) for transmission via the network (150). The terminal device (120) may receive the coded video data from the network (150), decode the coded video data to recover the video pictures and display the video pictures according to the recovered video data. Unidirectional data transmission may be implemented in media serving applications and the like.

In another example, the second pair of terminal devices (130) and (140) may perform bidirectional transmission of coded video data, for example, during a videoconferencing application. For bidirectional transmission of data, in an example, each of the terminal devices (130) and (140) may code video data (e.g., of a stream of video pictures that are captured by the terminal device) for transmission to and may also receive coded video data from another of the terminal devices (130) and (140) to recover and display the video pictures.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
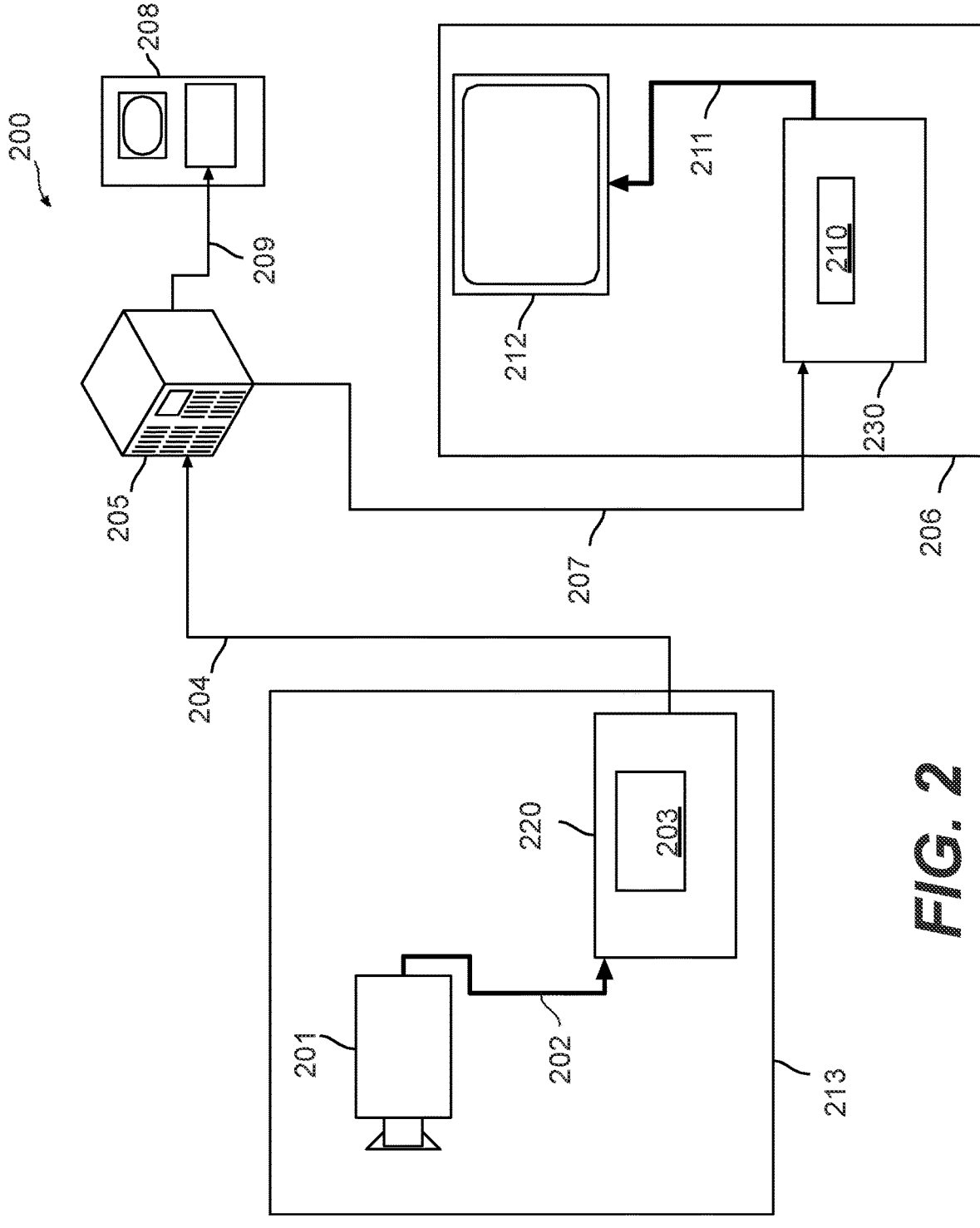
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source 201. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

FIG. 7 shows an example predefined 10-way partitioning structure/pattern allowing recursive partitioning to form a partitioning tree. The root block may start at a predefined level (e.g. from a base block at 128×128 or 64×64 level). The example partitioning structure of FIG. 7 includes various 2:1/1:2 and 4:1/1:4 rectangular partitions. In some example implementations, none of the rectangular partitions of FIG. 7 is allowed to be further subdivided. A coding tree depth may be further defined to indicate the splitting depth from the root node or root block. For example, the coding tree depth for the root node or root block may be set to 0, and after the root block is further split once following FIG. 7, the coding tree depth is increased by 1. In some implementations, only the all-square partitions in 710 may be allowed for recursive partitioning into the next level of the partitioning tree following pattern of FIG. 7.

In some other example implementations for coding block partitioning, a quadtree structure may be used. Such quadtree splitting may be applied hierarchically and recursively to any square shaped partitions. Whether a base block or an intermediate block or partition is further quadtree split may be adapted to various local characteristics of the base block or intermediate block/partition.

In yet some other examples, a ternary partitioning scheme may be used for partitioning a base block or any intermediate block, as shown in FIG. 8. The ternary pattern may be implemented vertical, as shown in 802, or horizontal, as shown in 804. While the example split ratio in FIG. 8 is shown as 1:2:1, other ratios may be predefined. In some implementations, two or more different ratios may be predefined. In some implementations, the width and height of the partitions of the example triple trees are always power of 2 to avoid additional transforms.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 9, where a base block is first quadtree split into four partitions, as shown by 902, 904, 906, and 908. Thereafter, each of the resulting partitions is either quadtree partitioned into four further partitions (such as 908), or binarily split into two further partitions (either horizontally or vertically, such as 902 or 906, both being symmetric, for example) at the next level, or non-split (such as 904). Binary or quadtree splitting may be allowed recursively for square shaped partitions, as shown by the overall example partition pattern of 910 and the corresponding tree structure/representation in 920, in which the solid lines represent quadtree splitting, and the dashed lines represent binary splitting. Flags may be used for each binary splitting node (non-leaf binary partitions) to indicate whether the binary splitting is horizontal or vertical. For example, as shown in 920, consistent with the partitioning structure of 910, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:

CTU size: the root node size of a quadtree (size of a base block)

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 9, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

The various CB partitioning schemes above and the further partitioning of CBs into PBs may be combined in any manner. The following particular implementations are provided as non-limiting examples.

Inter-prediction may be implemented, for example, in a single-reference mode or a compound-reference mode. In some implementations, a skip flag may be first included in the bitstream for a current block (or at a higher level) to indicate whether the current block is inter-coded and is not to be skipped. If the current block is inter-coded, then another flag may be further included in the bitstream as a signal to indicate whether the single-reference mode or compound-reference mode is used for the prediction of the current block. For the single-reference mode, one reference block may be used to generate the prediction block for the current block. For the compound-reference mode, two or more reference blocks may be used to generate the prediction block by, for example, weighted average. The reference block or reference blocks may be identified using reference frame index or indices and additionally using corresponding motion vector or motion vectors which indicate shift(s) between the reference block(s) and the current blocks in location relative to a frame, e.g., in horizontal and vertical pixels. For example, the inter-prediction block for the current block may be generated from a single-reference block identified by one motion vector in a reference frame as the prediction block in the single-reference mode, whereas for the compound-reference mode, the prediction block may be generated by a weighted average of two reference blocks in two reference frames indicated by two reference frame indices and two corresponding motion vectors. The motion vector(s) may be coded and included in the bitstream in various manners.

In some example implementations, one or more reference picture lists containing identification of short-term and long-term reference frames for inter-prediction may be formed based on the information in the Reference Picture Set (RPS). For example, a single picture reference list may be formed for uni-directional inter-prediction, denoted as L0 reference (or reference list 0) whereas two picture referenced lists may be formed for bi-direction inter-prediction, denoted as L0 (or reference list 0) and L1 (or reference list 1) for each of the two prediction directions. The reference frames included in the L0 and L1 lists may be ordered in various predetermined manners. The lengths of the L0 and L1 lists may be signaled in the video bitstream. Uni-directional inter-prediction may be either in the single-reference mode, or in the compound-reference mode when the multiple references for the generation of prediction block by weighted average in the compound prediction mode are on a same side of the frame where the block to be predicted is located. Bi-directional inter-prediction may only be compound mode in that bi-directional inter-prediction involves at least two reference blocks.

In some example implementations, an intra-inter prediction mode may be implemented in addition to the intra prediction mode and inter prediction mode. In the intra-inter prediction mode, the prediction block for a coding block may be generated, for example, as a weighted sum of one or more inter-prediction blocks and a prediction block containing intra-prediction samples.

In some example implementations, either intra coding or inter-coding may be allowed in different portions of in a particular coding region of a frame. Specifically, either intra coding or inter-coding may be allowed in different portions of a frame specified as a inter-prediction frame. In some other example implementations, if intra-inter prediction mode is permitted, either intra coding, or inter coding, or intra-inter coding may be allowed in different portions of a particular coding region of a frame (e.g., an inter coded frame). In particular, a portion or an entirety of a region of a frame or picture or slice at various partitioning levels (e.g., various recursive partitioning levels) may be coded in either inter prediction mode or intra prediction mode, or when intra-inter prediction is permitted, in either inter prediction mode, or intra prediction mode, or intra-inter prediction mode.

When a region or coding region of a frame is referred to as being coded in a particular prediction mode (e.g., inter prediction mode, intra prediction mode, or intra-inter prediction mode), portions, sub-regions, or sub-blocks of the region are all coded in that particular prediction mode. For example, when a region is referred to as being coded in the intra-prediction mode, all portions, sub-regions, or sub-blocks of the region are coded in the intra-prediction mode. Likewise, when a region is referred to as being coded in the inter-prediction mode, all portions, sub-regions, or sub-blocks of the region are coded in the inter-prediction mode. Likewise, when a region is referred to as being coded in the intra-inter prediction mode, all portions, sub-regions, or sub-blocks of the region are coded in the intra-inter prediction mode. When a region or coding region is not all intra predicted, inter predicted, or inter-intra predicted, then the region may include portions, sub-regions, or sub-blocks that are coded under different prediction modes. For example, some portions, sub-regions, or sub-blocks of the region may be inter-coded, some portions, sub-regions, or sub-blocks of the region may be intra coded, and other portions, sub-regions, or sub-blocks of the region may be intra-inter coded (if intra-inter prediction mode is implemented).

A region, or coding region, may be used to refer to any level in any one of the partitioning schemes described above or in any other partitioning schemes not specifically described above. A region therefore may be a frame, a slice, a super block, a macroblock, a subblock, a prediction block, and the like. For example, a region may be any partitioning level of a recursive partitioning scheme. A region may be at a leaf level or non-leaf level of a particular partitioning scheme. A leaf level region is not further partitioned. A non-leaf level region, on the other hand, is further partitioned into at least two sub-regions, each of which may be at a leaf level or may be at a non-leaf level and thus may be further partitioned. A leaf level region would be predicted in whole using a particular prediction mode. For example, a leaf-level region of any of the example partitioning schemes may be either inter coded or intra coded. In some other example implementations, if intra-inter prediction mode is permitted, a leaf level region or block or subblock or partition may be either inter coded, intra coded, or intra-inter coded.

In some example implementations of a partitioning scheme, when splitting a region into one or multiple sub-regions, at least one flag or syntax element may be included in the bitstream by an encoder (and thereby received, parsed and decoded by a decoder) for indicating whether all the sub-regions in the region are all coded with a pre-defined prediction mode or not. Such a flag may be referred to as a regional prediction mode flag syntax element at various reginal signaling levels. The partitioning scheme, for example, may be a recursive partitioning scheme. Therefore, when the region is being recursive split into one or multiples of equal size or smaller size sub-regions, at least one such flag may be included in the bitstream by an encoder (and thereby received, parsed and decoded by a decoder) to indicate whether all the sub-regions within this region are coded with the pre-defined prediction mode or not.

In some example implementations, the pre-defined prediction mode above may be an intra coding or intra prediction mode, an inter coding or intra prediction mode, or an intra-inter prediction mode. For example, the regional prediction mode flag for the region may indicate that all sub-regions of this region are intra coded, and as such, all the sub-regions, in any subsequent partitioning level of this region, are intra coded. The decoder may thus infer that all sub-regions are intra coded based on this regional prediction mode flag. Otherwise, the decoder may infer that not all sub-regions of the region are intra coded. Likewise, the regional prediction mode flag for the region may indicate that all sub-regions of this region are inter coded, and as such, all the sub-regions, in any subsequent partitioning level of this region, are inter coded. The decoder may correspondingly infer that all sub-regions are inter coded based on this regional prediction mode flag. Otherwise, the decoder may infer that not all sub-regions of the region are inter coded. For another example, the regional prediction mode flag for the region may indicate that all sub-regions of this region are coded in the intra-inter prediction mode. The decoder may correspondingly infer that all sub-regions of this region are intra-inter coded based on this regional prediction mode flag. Otherwise, the decoder may infer that not all sub-regions of the region are intra-inter coded.

In the example implementations above, when the regional prediction mode flag or syntax element for the region indicates that all sub-regions of this region are coded in the pre-defined prediction mode (intra-prediction mode, inter-prediction mode, or inter-intra prediction mode), then no such regional prediction mode flags or indicators may need to be included for any of the sub-regions when the region is further partitioned, and the decoder may infer that at all partitioning levels (e.g., recursive partitioning levels) down to the leaf partitions of this region are coded in the pre-defined prediction mode (inter prediction mode, or intra prediction mode, or intra-inter prediction mode). In such a manner, when all portions of a region at a particular parti-tioning level are either all coded in the predefined prediction mode (all intra coded or all inter coded or all intra-inter coded), then an overall regional prediction mode flag as described above may be included at the region level in the bitstream for such indication, thereby removing the neces-sity of including such indicators or flags at lower partition-ing levels, and further removing the necessity of the normal signaling of a prediction mode at the leaf level. Signaling overhead may thus be reduced.

As such, when the decoder determines via parsing the regional prediction mode flag syntax element that all sub-regions in the region are coded in the predefined prediction mode, it would not expect to see any additional such flags at lower partitioning level of the region and thus can skip parsing for such lower-level flags.

Such a regional-level prediction mode flag or syntax element included in the bitstream for the region may instead indicates that portions or sub-regions of the region are not all coded under the predefined prediction mode (e.g., the por-tions or sub-regions of the region may be coded under different prediction modes rather than coded all in the inter prediction mode or all in the intra prediction mode, or all in the intra-inter prediction mode). When the decoder parses the bitstream and determines that the parsed syntax associ-ated with such a flag for the region indicates that coded sub-regions within the region can use different prediction modes, then decoder may expect additional lower-level regional perdition mode flag(s)/indicators in the bit stream corresponding to sub-regions of this region for indicating whether each of the sub-regions are all coded under the predefined prediction mode (e.g., all under the intra predic-tion mode, all under the inter prediction mode, or all under the intra-inter prediction mode). These additional regional prediction mode flags/indicators may be included in the bitstream by the encoder at each of the corresponding partitioning level within the coding region.

In the example implementations above, whether all sub-regions of a region are coded under the predefined prediction mode may be indicated either by presence/absence of the flag/indicator, or by a value of the flag/indicator. For example, a presence of the flag/indicator syntax element in the bitstream for the region may indicate that all sub-regions of the region are coded under the predefined prediction mode, whereas an absence of the flag/indicator syntax element in the bitstream for the region may indicate that not all sub-regions of the region are coded under the predefined prediction mode. For another example, the flag/indicator may be predefined with a first value and a second value, indication that the sub-regions of the region are all or are not all coded under the predefined prediction mode, respec-tively. For yet another example, the flag be predefined with multiple predefined values, respectively indicating (1) all sub-regions are inter coded; (2) all sub-regions are intra coded; (3) all sub-regions are intra-inter coded; (4) the sub-regions are coded with two or more different prediction modes. For yet another example, the flag may be tiered. For example, a first-tier flag may indicate whether all sub-regions are intra-coded. If so, then there would be no further second tier flag. Otherwise, a second-tier flag may be included in the bit stream to indicate whether all sub-regions are inter-coded. Any other multi-value single tier flag schemes or multi-tier flag schemes may be implemented for the indication of whether a region at a particular partition level is all intra predicted, all inter predicted, all intra-inter predicted or not.

As a particular example, the regional prediction mode flag/indicator above at various partitioning levels may be referred to as intra_region_flag for indicating whether the corresponding region is all intra-coded or not in, for example, a frame of inter-prediction type (signaled by higher level syntax), either by presence/absence or value of the flag. In some example implementations, such a regional predic-tion mode flag may be signaled for a region when its sub partitioning regions are all intra coded and may otherwise not be signaled when its sub partitioning regions are not all intra coded. In some alternative example implementations, such a regional prediction mode flag may be provided with two different predefined values (e.g., as a binary flag) for indicating whether a region is all intra-predicted or not. In some example implementations, if it is indicated that a region is all intra-predicted, then no other intra_region_flags are included in the bitstream for lower partition levels of this region. If it is indicated for the region that the region is not all intra predicted (by either no presence of intra_region_ flag, or by a particular predefined value of intra_region_ flag), then intra_region_flag presence of value may be used for lower level partitions of the region to indicate whether the lower level partitions are all intra-coded or not.

In some example implementations, the syntax above, e.g., the intra_region_flag, may be recursively signaled either before or after a partitioning mode syntax element. For example, the example intra_region_flag, if present, may be received at a particular partitioning level for a region at the decoder side after a partitioning mode syntax element for the region where the partitioning mode syntax element indicates that the current region is further split into more than one sub-region. In such implementations, an absence of such partitioning mode syntax element for the region in the bitstream may indicate that the region is a leaf partition, and then no intra_region_flag may be included for this partition. Another leaf level flag may be included in the bitstream instead to indicate whether this leaf partition is intra coded, inter coded, or intra-inter coded, if there has been no higher-level flag indicating that this partition is all intra coded or all inter coded or all intra-inter coded.

In some example implementations, the intra_region_flag above or other equivalent flag may not be included in the bitstream and thus is not received at the decoder side when the block partitioning mode syntax indicates current region is not further split (leaf level partition). As described above, another leaf level flag may be included instead to indicate whether this leaf partition is intra coded, inter coded, or intra-inter coded, if there has been no higher-level flag indicating that this partition is all intra-coded or all inter-coded.

In some example implementations, if a leaf partition is not marked as within an intra block region by higher partition level intra_region_flag, then another flag may be signaled for the leaf partition to indicate whether the leaf partition is intra coded or inter coded (or intra-inter coded, if permitted).

FIG. 10 illustrates an example implementation above. In the example of FIG. 10, the region 1002 is quad split into four equal sized second level sub-regions 1010, 1020, 1030, and 1040. The second level sub-region 1010, for example, may be further quad-split into third level sub-regions 1012, 1014, 1016, and 1018. The second level sub-region 1020, for example, may be further split into third level sub-regions

1022 and 1024. The second level sub-region 1030, for example, may be further split into third level sub-regions 1032 and 1034. The second level sub-region 1040, for example, may be further split into third level sub-regions 1042, 1044, and 1046. Further in this example, the shaded partitions 1020 and 1030 are all intra coded, whereas each of the non-shaded partitions 1010 and 1040 are not all intra coded. As such, the intra_region_flag for the region 1002 may not be signaled (by absence of this syntax element) or may be signaled with a predefined value to indicate that the partitions of the region 1002 are not all intra-coded. As such, presence or a predefined value of intra_region_flag may be signaled for each of the partitions 1010, 1020, 1030, and 1040 that are all intra coded. For the partition 1020 and 1030, intra_region_flag or a predefined value of this flag may be signaled by presence or by a predefined value to indicate that their sub-partitions are all intra coded. Consequently, no further lower level intra_region_flags are included for partitions 1022-1024 and 1032-1034, no matter whether they are leaf level partitions or not. For partitions 1010 and 1040, an absence or a predefined value of intra_region_flag may be used to indicate that they are not all intra coded. Further intra_region_flags would be included as needed for each of their non-leaf sub-partitions 1012-1018 and 1042-1046.

FIG. 11 illustrates a further example with respect to how the presence or absence of intra_region_flag may be used for signaling intra prediction mode. FIG. 11 shows, as an example partitioning scheme, a top region 1102 into sub-regions or blocks at four levels labeled as level 1 through level 4. In FIG. 11, the partitioning starts at the top region 1102. The leaf level blocks include 1112, 1116, 1118, 1122, 1132, 1134, and 1126. Further in FIG. 11, the various white boxes represent regions or sub-regions for which intra_region_flags are not present, whereas the various black boxes represent regions or sub-regions for which intra_region_flags are present. In addition, the solid boxes in FIG. 11 represent regions or sub-regions where the decoder needs to read intra_region_flags to in order to determine for their presence, whereas the dashed boxes in FIG. 11 represent regions or sub-regions where the decoder does not need to detect presence (or skip the parsing) of the intra_region_flags.

Specifically, in FIG. 11, the top region 1102 does not include an intra_region_flag. The decoder parses the bitstream and determines that there is an absence of the intra_region_flag for 1102 and thus determines that not all of its sub-regions 1110 and 1120 are all intra coded. For partition 1110, the decoder further parses the bitstream and determines that the intra_region_flag is not present for 1110. The partition 1110 includes sub partitions 1112 and 1114. The partition 1112 is a leaf partition. As such, the decoder does not need to determine whether any intra_region_flag is present. Instead, the decoder reads a leaf-level prediction mode indicator for 1112 in order to determine its prediction mode. With respect to partition 1114, which is not a leaf partition, the decoder further parses the bit stream to determine that the intra_region_flag is present for 1114 and thus determines that the entire 1114 is coded in the intra prediction mode. No intra_region_flags may be present for 1116 and 1118 both because that they are leaf blocks and they have been flagged at 1114 as being intra-predicted. With respect to the other sub-region 1120 of the top region 1102, the decoder may parse the bitstream to identify a presence of the intra_region_flag and determines that the entirety of 1120 is intra coded. As such, the decoder will not perform any additional determination of intra_region_flags when parsing any other sub-partitions below 1120, including 1122, 1124, 1132, 1134, and 1126. The leaf partitions 1122, 1132, 1134, 1126, 1116 and 1118 may not even need to include any other prediction mode indicators because they are intra-predicted as indicated by the intra_region_flags presence at 1120 or 1114. The leaf partition 1112, however, would include a prediction mode indicator for the decoder to determine its prediction mode.

FIG. 12 illustrates a further example with respect to how a value of intra_region_flag may be used for signaling intra prediction mode. The partitioning schemes in the examples of FIG. 12 and FIG. 11 are similar, except that values of the intra_region_flag are used to indicate whether the corresponding region is all intra coded. In this example, "Y" indicates that the region is all intra-coded, and "N" indicate that the region is not all intra coded. The values of "Y" or "N" of the intra_region_flags for the various regions or sub-regions are indicated in FIG. 12 (e.g., partitions 1202, 1210, 1220 and 1214). Where the values are not indicated, the intra_region_flags are not included (e.g., in sub-region of a region with "Y" indication, such as 1216, 1218, 1222, 1224, 1226, 1232, and 1234, or in a leaf partition such as 1212, or both, such as 1216, 1218, 1222, 1226, 1232, and 1234).

In some example implementations, the syntax intra_region_flag or other equivalent syntax elements which indicate whether all the coded sub-regions within one region are all intra coded or not, may be signaled when the size of the region is smaller than or equal to a size threshold. In some example implementations, it may not be signaled when the region is larger than the size threshold, and the decoder can assume that the sub-regions are not all coded using the predefined prediction mode and would not skip parsing for lower level intra_region_flags. Such implementation can further help reduce signaling overhead because large regions are more likely than not mixed with different prediction modes therewithin.

In some example implementations, the size of the region above can be measured by one or more of a width, a height, an area (width×height), a maximum value between the width and height of the region in samples. For a particular example, the size threshold above may be set to 1024, and representing an area threshold (width×height). For a region with area larger than or equal to 1024, no intra_region_flag may be included in the bitstream for the region. For a region with area smaller than 1024, intra_region_flag may be signaled to indicate that the region is all intra coded, and an absence of intra_region_flag (when such signaling is performed by absence/presence) would indicate that the region is not all intra coded (rather than assuming that the region is not all intra coded, as in when the size is larger than or equal to the size threshold).

In some example implementations, the size of current region may be used as a context for entropy coding the signaling the intra_region_flag. Again, the size can refer to width, height, area (width×height), maximum value between width and height (and the like) of the region in number of samples. Such implementation may thus utilize a correlation between the size and intra_region_flag of the region to achieve better entropy coding efficiency.

In the example implementations above, the intra_region_flag and its equivalents may be only signaled into the bitstream and parsed at the decoder side when current frame/slice is inter coded frame/slice. In other words, an intra coded frame/slice may not include inter-coded portions and the decoder may assume that all portions of an intra coded frame/slice are intra-coded.

In some example implementations, one high level syntax may be included in the bitstream by the encoder and received at the decoder side to indicate whether the indication for the predetermined prediction mode can be applied to current sequence/frame/slice/super block or not. In other words, whether the scheme above is used at and below a particular partition level may be enabled or disabled. If it is disabled, then no region level flag as described above may be included in the bitstream, and prediction mode may instead be indicated at leaf level for each of the leaf blocks.

In some example implementations, for a picture that can be coded with both intra and inter prediction modes, for a coding region, when an intra_region_flag is signaled by presence or with a value indicating that all sub-regions of the region are coded using the intra prediction mode, the luma and chroma components within this block region may be coded with different block partitioning modes. For example, in such situations, the luma component and the chroma components may be partitioned differently (using different partition schemes or similar schemes but different partitioning). In some example implementations, if the region is not all coded with intra prediction mode, then the luma component and chroma components of this region may follow the same partitioning mode.

In some example implementations, for a picture that can be coded with both intra and inter prediction modes, for a coding region, when an intra_region_flag is signaled with presence or with a value indicating that all sub-regions are coded using intra prediction mode, the partitioning modes of luma and chroma components within this region can be signaled separately. They are signaled separately such that they can have different partitioning modes. In some example implementations, if the region is not all coded with intra prediction mode, then partitioning mode for the luma component and chroma components of this region may be jointly signaled and shared.

In some example implementations, for a picture that can be coded with both intra and inter prediction modes for a region, when an intra_region_flag is signaled with a value indicating that all sub-regions are coded using intra prediction mode, the partitioning modes of luma and chroma components within this block region may be conditionally signaled separately according to one or more conditions. When the conditions are met, the partitioning modes of luma and chroma components within this block region may be signaled separately, whereas when the conditions are not met, the partitioning modes of luma and chroma components within this block region are signaled jointly and shared.

In some example implementations, the one or more conditions above may include a size (e.g., width, height, area, as described above) of the region being less than a predetermined size threshold.

In some other example implementations, the one or more conditions may be related to values of quantization parameters.

In some other example implementations, the one or more conditions may be related to temporal layer of the current picture.

FIG. 13 illustrates an example logic flow 1300 according the implementations above. The logic flow 1300 starts at S1301. In S1310, a bitstream of a video frame signaled as being inter predicted is received. In S1320, the bitstream is parsed to determine, at a signaling level of a coding region within the video frame, whether the coding region is entirely coded in a first predefined prediction mode, the coding region being indicated as including at least two sub coding regions. In S1330, for a first subset of the at least two sub coding regions determined as not being entirely coded in the first predefined prediction mode, the bitstream is recursively parsed to further determine whether each of the first subset of the at least two sub coding regions is entirely coded in a second predefined prediction mode. The logic flow 1300 stops at S1399.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height: width) of the block.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method comprising:
receiving a bitstream of a video frame signaled as being coded in an inter prediction mode; and
only when the video frame is coded in the inter prediction mode:
    determining, at a signaling level of a coding region within the video frame, whether the coding region is entirely coded in a first predefined prediction mode among a plurality of prediction modes including the inter prediction mode, an intra prediction mode, and an intra-inter prediction mode, the coding region being indicated as including at least two sub coding regions;
    when the coding region is entirely coded in the first predefined prediction mode, skipping parsing the bitstream for purposes of further determining prediction modes in lower partition levels within the coding region; and
    when the coding region is not entirely coded in the first predefined prediction mode, continuing parsing the bitstream to further determine prediction modes within the coding region by: for a first subset sub coding regions of the at least two sub coding regions determined as not being entirely coded in the first predefined prediction mode, recursively parsing the bitstream to further determine whether each of the first subset sub coding regions of the at least two sub coding regions is entirely coded in a second predefined prediction mode among the plurality of prediction modes.

2. The method of claim 1, wherein the first subset sub coding regions of the at least two sub coding regions is smaller than a full set of the at least two sub coding regions.

3. The method of claim 1, wherein determining whether the coding region is entirely coded in the first predefined prediction mode comprises one of:
determine a presence or absence of a regional prediction mode flag syntax element in the bitstream at the signaling level of the coding region as an indication of whether or not the coding region is entirely coded in the first predefined prediction mode, respectively; or
determining a value of the regional prediction mode flag syntax element in the bitstream at the signaling level of the coding region to determine whether the coding region is entirely coded in the first predefined prediction mode or not.

4. The method of claim 3, wherein when it is determined that the coding region is entirely coded in the first predefined prediction mode, determining that no regional prediction mode flag syntax element is included in the bitstream for any of the at least two sub coding regions and for any further partitions of the at least two sub coding regions.

5. The method of claim 3, wherein when it is determined that the coding region is not entirely coded in the first predefined prediction mode, the method comprises further determining at a signaling level of the at least two sub coding regions whether each of the at least two sub coding regions that is a non-leaf partition is entirely coded in the first predefined prediction mode.

6. The method of claim 3, wherein the regional prediction mode flag syntax element, when present at the signaling level of the coding region, is included in the bitstream after a partitioning mode syntax element for the coding region, the partitioning mode syntax element indicating that the coding region is further partitioned into the at least two sub coding regions.

7. The method of claim 3, wherein when it is determined that the coding region is not entirely coded in the first predefined prediction mode, and in response to determining that a sub coding region of the at least two sub coding regions is a leaf partition:

skipping parsing the bitstream for any regional prediction mode flag syntax element for the sub coding region; and parsing the bitstream for a prediction mode indicator syntax element for the sub coding region to determine its prediction mode.

8. The method of claim 1, wherein a regional prediction mode flag syntax element indicative of whether the coding region is entirely coded in the second predefined prediction mode is signaled in the bitstream at the signaling level of the coding region only when a size of the coding region is smaller than or equal to a predefined size threshold.

9. The method of claim 8, where the size of the coding region comprises a width, a height, a maximum of width and height, or an area of the coding region measured by a number of samples.

10. The method of claim 9, wherein the size of the coding region comprises the area of the coding region and the predefined size threshold is 1024.

11. The method of claim 1, wherein a size of the coding region is used as a context for entropy coding a regional prediction mode flag syntax element in the bitstream at the signaling level of the coding region for indicating whether the coding region is entirely coded in the first predefined prediction mode.

12. The method of claim 1, further comprising determining, at a signaling level higher than the coding region, an regional prediction mode enablement syntax element that indicate whether to a signaling of a regional prediction mode flag syntax element for the coding region in the bitstream is enabled or not, the regional prediction mode flag syntax element being used to indicate whether the coding region is entirely coded in the first predefined prediction mode.

13. The method of claim 1, wherein:

the first predefined prediction mode comprises an intra prediction mode; and when it is determined that the coding region is entirely coded in the intra prediction mode, the method further comprises determining partition modes for luma component and chroma components of the coding region separately, or determining partition modes for luma component and chroma components of the coding region separately in response to a predefined set of conditions.

14. The method of claim 13, wherein the partition modes for the luma component and the chroma components of the coding region are signaled separately in the bitstream.

15. The method of claim 13, wherein the predefined set of conditions comprise criteria relating to at least one of:

a size of the coding region being less than a predefined size threshold;

a quantization parameter value; and information related to a temporal layer of the video frame.

16. A video encoder comprising a memory for storing instructions and a processor configured to execute the instructions to:

determine that a video frame is coded in an inter prediction mode and include in a bitstream of the video frame a first signaling indicating that the video frame is inter predicted; and only when the video frame is coded in the inter prediction mode:

determine, at a level of a coding region within the video frame, whether the coding region is entirely coded in a first predefined prediction mode among a plurality of prediction modes including the inter prediction mode, an intra prediction mode, and an intra-inter prediction mode, the coding region being indicated in the bitstream as including at least two sub coding regions, and include a second signaling in the bitstream indicating whether the coding region is entirely coded in the first predefined prediction mode;

when the coding region is entirely coded in the first predefined prediction mode, encoding the coding region with the first predefined prediction mode at all lower partition levels without including any further syntax elements in the bitstream for purposes of determining prediction modes of lower level partitions of the coding region; and when the coding region is not entirely coded in the first predefined prediction mode, for at least a first subset sub coding regions of the at least two sub coding regions, further determine and include a third signaling in the bitstream to indicate whether each of the first subset sub coding regions of the at least two sub coding regions is to be entirely coded in a second predefined prediction mode among the plurality of prediction modes.

17. The video encoder of claim 16, wherein:

the first subset sub coding regions of the at least two sub coding regions is smaller than a full set of the at least two sub coding regions.

18. A non-transitory computer-readable recording medium for storing a video bitstream of a video that is generated by a video encoding method, the video encoding method comprising:

determining that a video frame is coded in an inter prediction mode and include in the video bitstream of the video frame a first signaling indicating that the video frame is inter predicted; and only when the video frame is coded in the inter prediction mode:

determining, at a level of a coding region within the video frame, whether the coding region is entirely coded in a first predefined prediction mode among a plurality of prediction modes including the inter prediction mode, an intra prediction mode, and an intra-inter prediction mode, the coding region being indicated in the video bitstream as including at least two sub coding regions, and including a second signaling in the video bitstream indicating whether the coding region is entirely coded in the first predefined prediction mode;

when the coding region is entirely coded in the first predefined prediction mode, encoding the coding region with the first predefined prediction mode at all lower partition levels without including any further syntax elements in the video bitstream for purposes of determining prediction modes of lower level partitions of the coding region; and when the coding region is not entirely coded in the first predefined prediction mode, for at least a first subset sub coding regions of the at least two sub coding regions, further determining and including a third signaling in the video bitstream to indicate whether each of the first subset sub coding regions of the at least two sub coding regions is to be entirely coded in a second predefined prediction mode among the plurality of prediction modes.

* * * * *